Figure 1:
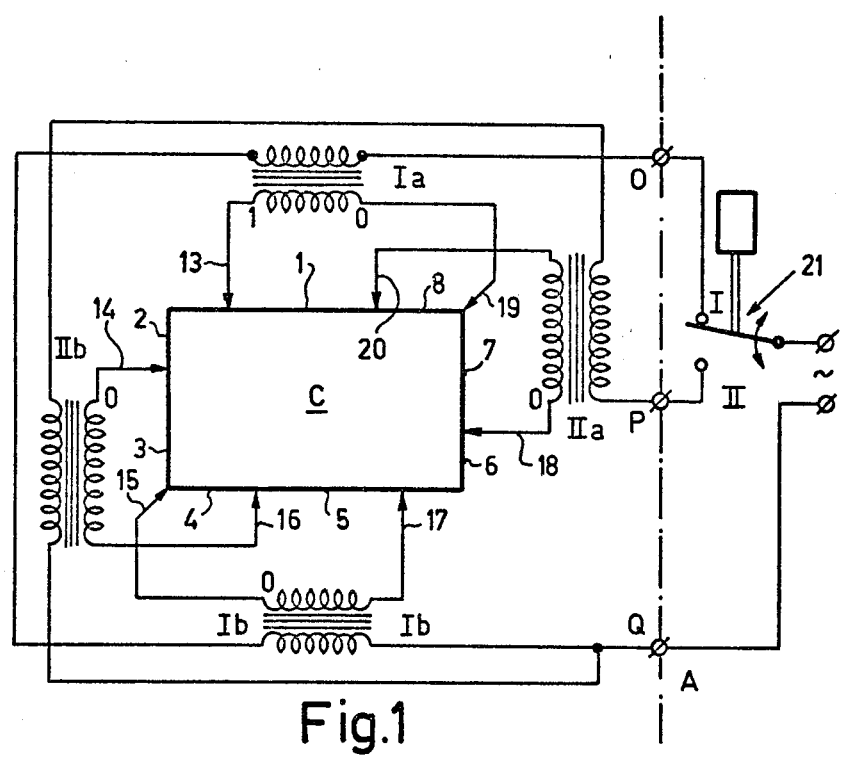

United States Patent [19]

Groot et al.

[11] 3,967,945

[45] July 6, 1976

[54] METHOD OF SEALING GLASS OBJECTS TO ONE ANOTHER BY PASSING A CURRENT THROUGH THEM

[75] Inventors: Theodorus Cornelis Groot; Johan Josephus Hendricus Bogaard, both of Eindhoven, Netherlands

[73] Assignee: U.S. Philips Corporation, New York, N.Y.

[22] Filed: Feb. 6, 1975

[21] Appl. No.: 547,600

Related U.S. Application Data

[63] Continuation of Ser. No. 452,150, March 18, 1974, abandoned.

[30] Foreign Application Priority Data

Mar. 19, 1973 Netherlands................. 7303770

[52] U.S. Cl.................................. 65/40; 65/58; 65/156; 65/DIG. 4
[51] Int. Cl.².......................................... C03B 23/20
[58] Field of Search ............ 65/40, 58, 156, DIG. 4

[56] References Cited

UNITED STATES PATENTS

| | | | |
|---|---|---|---|
| 3,359,089 | 12/1967 | Gidwani................................. | 65/40 |
| 3,493,356 | 2/1970 | Torrence .............................. | 65/58 |
| 3,628,935 | 12/1971 | Jansson et al........................... | 65/40 |
| 3,796,556 | 3/1974 | Shephard et al....................... | 65/40 |

*Primary Examiner*—Robert L. Lindsay, Jr.
*Attorney, Agent, or Firm*—Frank R. Trifari; Daniel R. McGlynn

[57] ABSTRACT

Method of sealing glass objects to one another by means of comparatively low voltages, in which method the preheated seal joint is heated by passing current through it by means of a large number of electrodes which are in mechanical contact with the glass and belong to at least two current circuits which are periodically switched on and off and each comprise at least two series-connected current sources.

7 Claims, 4 Drawing Figures

METHOD OF SEALING GLASS OBJECTS TO ONE ANOTHER BY PASSING A CURRENT THROUGH THEM

This is a continuation of application Ser. No. 452,150, filed Mar. 18, 1974, now abandoned.

The invention relates to a method of sealing glass objects to one another by passing an electric current through them, in which method preheated sealing edges of the glass objects form a seal joint to which the current is supplied by means of electrodes which are in contact with and stationary in relation to the seal joint. The invention relates particularly to sealing a face plate to a tapered envelope portion of a colour television display tube.

Sealing glass objects to one another, in particular sealing a face plate to a tapered envelope portion of a cathode-ray tube, is described in Netherlands Pat. No. 55,157 (= Brit. Pat. No. 524,126). The method described requires high electric voltages (of about 10 kV) because the current is supplied via ionized gas jets (burners). This method is unsuitable for use with cathode-ray tubes in which, before the face plate is sealed to the tapered portion, electrodes, such as screens, a shadow mask, a conducting wall coating and the like are to be provided in the tube, because owing to the high electric sealing voltages flash-over to these electrodes is produced.

In order to reduce the sealing voltage the electrodes may be made to contact the glass of the preheated seal joint and the number of electrodes may be increased. Thus, however, the seal joint cannot satisfactorily be moved in relation to the electrodes in the usual manner.

Sealing a face plate to a tapered envelope portion of a display tube by means of stationary electrodes is described inter alia in British Pat. No. 751,196. In the method described a polyphase current is used and heating is more uniform by the use of a plurality of electrodes which belong to different current circuits which operate independently of one another and may successively be switched on and off. Switching on and off may be effected by mechanical means or by means of phase-shifted currents. However, in this method also the electric current is supplied to the seal joint via ionized gas jets (burners). As has been mentioned hereinbefore, this requires the use of comparatively high voltages. Furthermore U.S. Pat. No. 2,389,360 describes a method in which the electric current is supplied to the preheated seal joint by means of electrodes which are in direct contact with the joint. Thus two current circuits adapted to be switched on and off independently of one another can be used, the current being successively passed through each of the four sides of a rectangular glass article.

Because glass even when hot still has a comparatively high electric resistance, in sealing a face-plate to a tapered envelope portion of a colour television display tube, even when electrodes are used which are brought into direct contact with the preheated seal joint, a comparatively high electric voltage is still required between the electrodes. This voltage may be reduced by decreasing the spacing between adjacent electrodes. Because the electrodes when they are stationary in relation to the sealing joint must be evenly spaced along the periphery of the glass objects, a comparatively large number of electrodes must be used, in particular if the glass objects have large cross-sectional areas and hence the seal joint is long. When using the known arrangements a plurality of electrodes are to be interconnected in each circuit, so that there is much likelihood of uneven heating of some portions of the joint, because no compensation occurs when the joint locally has a higher resistance owing to local cooling. This may partially be avoided by the provision of chokes or ballast resistors in the secondary circuits, but this again requires an increase of the electric voltage. U.S. Pat. No. 2,428,969 describes the use of polyphase current to obtain even heating, however, in this method also there is no compensation for areas of the joint of different resistance, because a fixed voltage is applied to each current source irrespective of the current it supplies.

It has beem found that the said disadvantages can be entirely avoided and at the same time temperature compensation of the seal joint can be obtained in a method of sealing glass objects to one another by passing an electric current through them in which preheated sealing edges of the glass objects form a seal joint to which the electric current is supplied by means of electrodes which are in contact with and stationary in relation to the seal joint and belong to at least two current circuits which operate independently of one another and are periodically switched on and off and the electrodes of which are evenly spaced along the entire seal joint, if, according to the invention, each current circuit comprises at least two series-connected similar transformers, the successive electrodes of each current circuit having potentials of opposite signs applied to them and being connected to the secondary windings of the said transformers. The transformers must have their primary windings connected in series. The secondary windings are connected in series by portions of the seal joint, and the primary windings are connected in series to the supply source, which generally will be the public mains. Alternate switching on and switching off of the circuits may be effected by mechanical means or by phase shifting. The periods during which the various circuits are in the switched-on condition may overlap.

It has been found that the series connection of the current sources and the successive switching of the current circuits produce temperature compensation so that the joint is evenly sealed. The use of chokes or ballast resistors in the secondary circuits has proved to be unnecessary. However, steps are to be taken, preferably in the primary supply from the mains, to prevent excessive increase of the power owing to the negative temperature coefficient of resistance.

Figure 2:
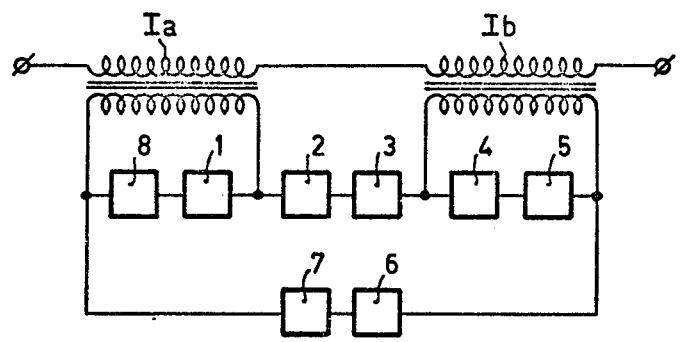
Figure 3:
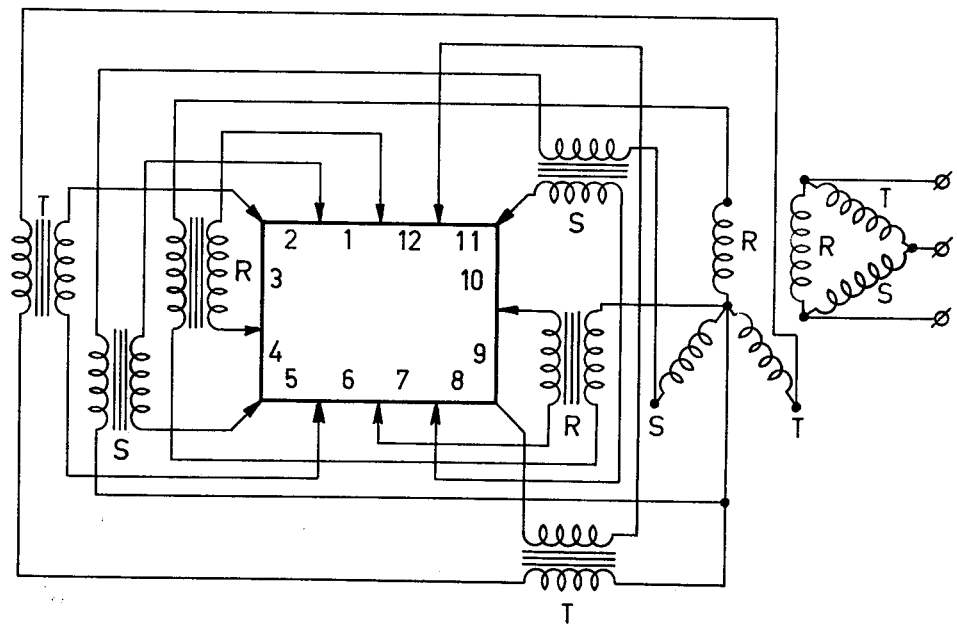
Figure 4:
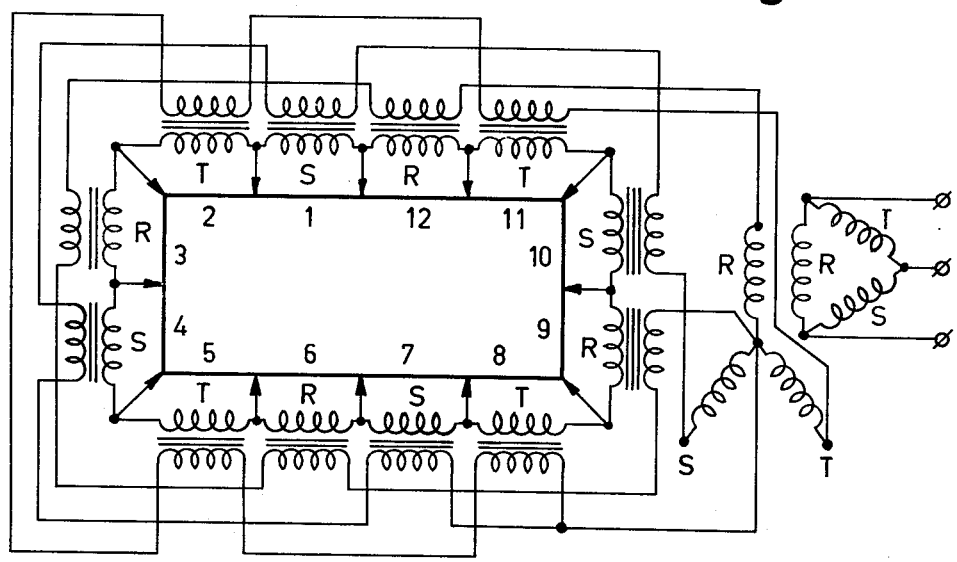

Embodiments of the invention will now be described, by way of example, with reference to the accompanying diagrammatic drawings, in which:

FIG. 1 shows schematically an embodiment of a sealing apparatus according to the invention in which the current circuits are switched by mechanical means, whilst FIG. 2 shows a manner in which in the apparatus of FIG. 1 the voltage is distributed over the seal joint, and FIGS. 3 and 4 each show an embodiment in which heating is effected by means of three-phase current.

Referring now to FIG. 1, reference character O denotes a glass article, which in the present case has a rectangular cross-section, two portions of which, for example a face-plate and a tapered envelope portion of a cathode-ray tube, are to be sealed to one another, the edges of the portions being preheated and forming a rectangular seal joint 1 to 8. Eight electrodes 13 to 20 are evenly spaced in contact with the seal joint. The said eight electrodes belong to two current circuits I and II which operate independently of one another and each include two series-connected transformers. The circuits can alternately be switched on and switched off by means of a switch 21. The period of the switching frequency may be selected from arbitrarily short to from 5 to 10 seconds. With longer periods, some portions of the seal joint are likely to be locally cooled excessively so that the electric resistance at these locations becomes too high to be sufficiently compensated.

In the position shown the current circuit I is operative. The portions 8 and 1 are connected by the electrodes 13 and 19. The ends of the secondary windings the potentials of which momentarily have the same sign are indicated by circles. The voltages of the secondary windings of transformers I$a$ and I$b$ are set up across the portions 1, 8 and 4, 5 respectively. However, the voltages of these transformers, viewed along the circumference of the seal joint, are added to one another, so that equal potential differences are set up across portions 2, 3 and 6, 7. Thus the same current will flow through the entire seal joint as long as the resistance of the latter is the same at all points. However, if for example the resistance of a portion 1, 2 of the seal joint should increase owing to locally increased cooling, the load of the transformer I$a$ will be reduced so that its impedance is increased. As a result a higher voltage will be set up across the primary and secondary windings so that the current through 1, 2 and hence the temperature will increase again, whereas the current through the remaining portions will decrease, because the transformer I$b$ will pass less current, until the temperature and hence the resistance in the portions of the seal joint again is the same at all points. Because the voltages across the portions 8, 1 and 4, 5 are equal to those across the portions 2, 3, 6 and 7 (see the circuit diagram of FIG. 2) the circuit in which the highest resistance is produced is liable to be further cooled; if for example one or more of the portions 2, 3, 6 and 7 are given a higher resistance (are cooled), the portions 2, 3, 6 and 7 will be cooled even more, because the current will mainly flow through 8, 1, 4 and 5. This is prevented by timely switching of the circuits. Since the electrodes of these circuits are arranged in alternating order, the electrode of the circuit II which is in contact with the middle of the joint portion of increased resistance will have a higher voltage applied to it, so that this portion will pass more current and its temperature will rise, whereas less current is supplied to the remaining portions so that the latter will be cooled until the temperature is equal again at all points. The switching frequency may be arbitrarily high. The lowest switching frequency depends upon the degree in which the seal joint may locally be cooled, and its minimum value may be about 0.1 Hz. Switching must be effected before important temperature differences can be produced in the portions of the joint. Consequently the higher the switching frequency the better.

As an alternative, three-phase current may advantageously be used in the manner shown in FIG. 3. The phase-shifted currents in the circuits R, S and T eliminate the need for switching.

In order to keep the heating voltage low a large number of electrodes may be used. The voltage required is about 5 volts per mm of the length of the seal joint. Hence with a spacing of 10 cm between electrodes which belong to the same circuit the voltage will have to be about 500 volts, which still is permissible since it will not give rise to flash-over when sealing the envelope portions of a colour television display tube. A display tube having a screen diagonal of 62 cm (26 inch) has a seal joint of a length of about 2 meters so that 20 electrodes are required for each circuit.

Because the electric contact of the electrodes to the glass of the seal joint may be unsatisfactory it is of advantage to restrict the number of electrodes. In the case of a three-phase supply this is obtainable by connecting each secondary transformer winding to two adjacent electrodes and by connecting all the secondaries in series, as is shown in FIG. 4. In this arrangement the voltage may be one-third of that required in the arrangement of FIG. 3, and one-half of that required in the arrangement of FIG. 1, with the same number of electrodes. If the same voltage of 500 volts between the electrodes of any one circuit is allowed, the number of electrodes required in the arrangement of FIG. 4 need not be more than about one-third of the number of electrodes in the arrangement of FIG. 3. Thus in the case of the aforementioned display tube having a screen diagonal of 62 cm the number of electrodes may be reduced from 40 to 12. With a three-phase current, the number of electrodes must be a multiple of 3.

Although only four embodiments have been described, other combinations of circuits are possible within the scope of the invention, provided that a series connection of the transformers of each circuit is used.

We claim:

1. A method of sealing glass objects to one another by passing an electric current through portions thereof, said method comprising the steps of:
    preheating edges of objects to be sealed, the edges adapted to forming a seal joint;
    positioning stationary electrodes about said entire seal joint;
    supplying electric current to said electrodes from at least two independent current circuits, each circuit having at least two transformers, the secondary windings of said transformers being connected to said electrodes so that at least some successive electrodes of each circuit have potentials of opposite signs; and
    switching said two circuits on and off.

2. Method as defined in claim 1 wherein three current circuits are used which are supplied with three-phase current.

3. Method as defined in claim 1, wherein each secondary transformer winding is connected to adjacent electrodes.

4. Method as defined in claim 1 wherein the primary windings of said transformers are connected in series.

5. Method as defined in claim 1 wherein said transformers are substantially similar.

6. Method as defined in claim 1 wherein said electrodes are evenly positioned about said entire seal joint.

7. Method as defined in claim 1 wherein said electrodes are in mechanical contact with said joint.

\* \* \* \* \*

UNITED STATES PATENT AND TRADEMARK OFFICE
CERTIFICATE OF CORRECTION

PATENT NO. : 3,967,945
DATED : July 6, 1976
INVENTOR(S) : THEORDORUS CORNELIS GROOT ET AL It is certified that error appears in the above-identified patent and that said Letters Patent are hereby corrected as shown below:

Claim 1, line 15, before "switching" insert --periodically--

Signed and Sealed this

Second Day of November 1976

[SEAL]

Attest:

RUTH C. MASON
Attesting Officer

C. MARSHALL DANN
Commissioner of Patents and Trademarks